No. 619,003. Patented Feb. 7, 1899.
A. R. TIRRELL.
WAGON SHAFT AND APPURTENANT HARNESS.
(Application filed Dec. 30, 1897.)
(No Model.)
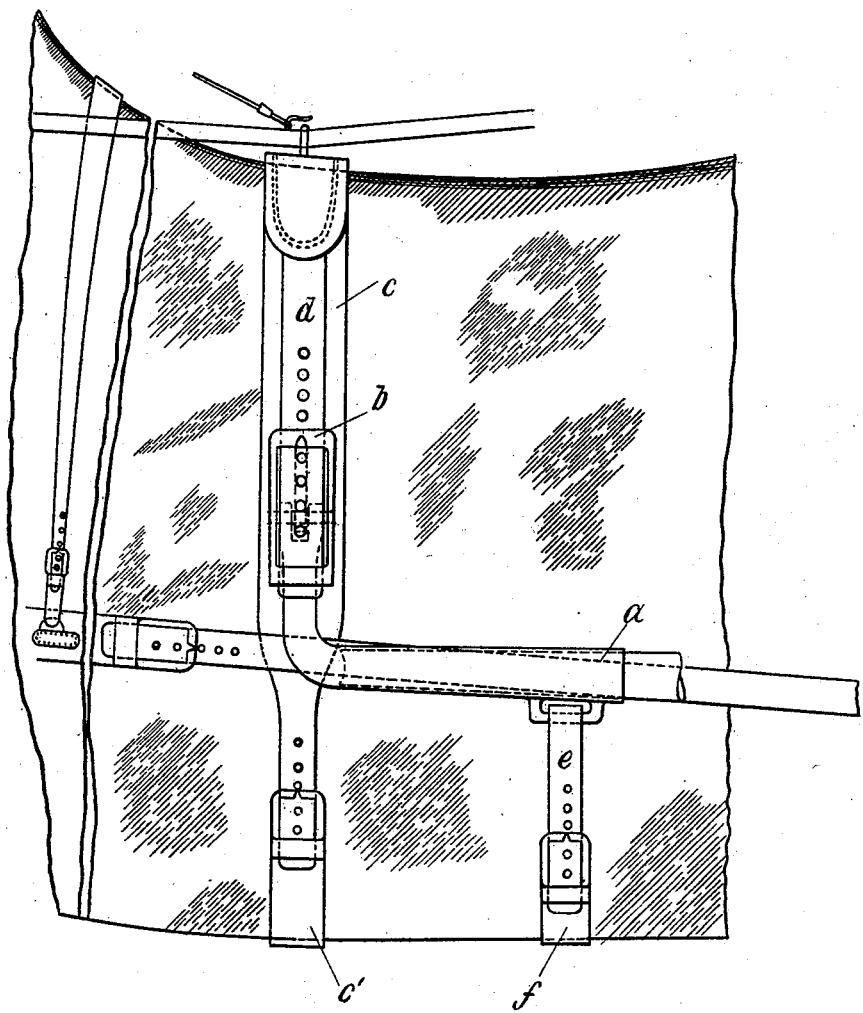
Witnesses
Florence F. Bragg.
Caspar Simonds
Inventor
Artemas R. Tirrell
By W. E. Simonds
Attorney

UNITED STATES PATENT OFFICE.

ARTEMAS R. TIRRELL, OF UNIONVILLE, CONNECTICUT.

WAGON-SHAFT AND APPURTENANT HARNESS.

SPECIFICATION forming part of Letters Patent No. 619,003, dated February 7, 1899.

Application filed December 30, 1897. Serial No. 664,588. (No model.)

*To all whom it may concern:*

Be it known that I, ARTEMAS R. TIRRELL, a citizen of the United States of America, residing at Unionville, in the county of Hartford and State of Connecticut, have invented a certain new and useful Improvement in Wagon-Shafts and Appurtenant Harness, of which the following is a description, reference being had to the accompanying drawing, which shows a side view of a portion of a horse, harness, and shafts embodying the vital parts of said improvement.

The object of the improvement is the production of wagon-shafts and appurtenant harness in which the front ends of the shafts terminate a little in the rear of the animal's forward legs, with resulting advantages in point of safety to all concerned, as well as some other advantages.

In the accompanying drawing the letter *a* denotes the wagon-shafts, the front ends of which terminate a little back of the animal's forward legs. There they turn upwardly and are equipped with the buckles *b*. The saddle *c* and straps *d* constitute a support for the forward ends of the shafts, passing over the animal's back. The straps *d* are designed to take into the buckles *b*. Wherefore it results that the said support is one which is attachable to and detachable from said shafts at pleasure. The saddle *c* has its own girth *c'*.

The letter *e* denotes straps pendent from the shafts.

The letter *f* denotes a strap equipped with buckles at the end for coöperation with the straps *e*. This strap *f* passes under the body of the horse.

It is a matter of common knowledge that the front ends of wagon-shafts projecting, as is common, beyond the breast of the horse are not infrequently the cause of accident to animals and persons with whom the horse may come in contact, as well as to the horse itself. Furthermore, the case is not uncommon when the up-and-down motion of the front ends of the shafts irritate and even chafe the horse harnessed therein, and, still further, it has been found by actual use of the improvement herein described that it gives the horse greater ease and comfort in his daily and ordinary work.

I claim as my improvement—

1. In combination; wagon-shafts terminating at their front ends a little back of the animal's forward legs; ordinary draw-straps adapted to extend from the ordinary collar or breast-strap to the ordinary whiffletree; a support for said front ends of said shafts, passing over the animal's back; and an attachable and detachable strap connecting one of said shafts to the other and passing under the animal's body; all substantially as described and for the purposes set forth.

2. In combination; wagon-shafts terminating at their front ends a little back of the animal's forward legs, there turned upwardly and provided with buckles; ordinary draw-straps adapted to extend from the ordinary collar or breast-strap to the ordinary whiffletree; a support for said front ends of said shafts, passing over the animal's back and adapted for attachment to and detachment from said buckles; and a detachable and attachable strap connecting one of said shafts to the other and passing under the animal's body, all substantially as described and for the purposes set forth.

ARTEMAS R. TIRRELL.

Witnesses:
W. E. SIMONDS,
FLORENCE M. BRAGG.